United States Patent
Kim et al.

(10) Patent No.: US 10,633,192 B2
(45) Date of Patent: Apr. 28, 2020

(54) TRAY-AND-TABLEWARE FLIPPING DEVICE AND DISHWASHING SYSTEM USING SAME

(71) Applicant: PRIME.CO., LTD., Incheon (KR)

(72) Inventors: Sung Hyun Kim, Incheon (KR); Sung Woo Kim, Seoul (KR)

(73) Assignee: PRIME.CO., LTD., Incheon (KR)

( * ) Notice: Subject to any disclaimer, the term of this patent is extended or adjusted under 35 U.S.C. 154(b) by 0 days.

(21) Appl. No.: 16/212,653

(22) Filed: Dec. 6, 2018

(65) Prior Publication Data

US 2019/0315572 A1    Oct. 17, 2019

(51) Int. Cl.
*B65G 47/24* (2006.01)
*B65G 47/252* (2006.01)

(52) U.S. Cl.
CPC .................. *B65G 47/252* (2013.01)

(58) Field of Classification Search
CPC .... B65G 47/248; B65G 47/252; B65G 47/24; A47L 15/241
USPC ............ 198/403, 404, 397.02; 414/758, 761, 414/762, 773; 134/124, 133
See application file for complete search history.

(56) References Cited

U.S. PATENT DOCUMENTS

| | | | | |
|---|---|---|---|---|
| 2,565,779 A * | 8/1951 | Muddiman | ............. | B21B 39/32 198/404 |
| 4,058,202 A * | 11/1977 | Reist | ...................... | B65H 29/00 198/470.1 |
| 4,076,113 A * | 2/1978 | Shields | .................. | B65G 47/24 198/403 |
| 4,274,886 A * | 6/1981 | Noren | .................... | A47L 15/247 134/133 |
| 4,286,907 A * | 9/1981 | Houle | ..................... | B65H 29/40 271/196 |
| 4,645,400 A * | 2/1987 | Mally | ...................... | B26D 7/32 198/404 |
| 4,676,365 A * | 6/1987 | Noren | .................... | A47L 15/247 134/133 |
| 5,421,690 A * | 6/1995 | Litterst | ................. | A47L 15/247 134/126 |
| 5,620,081 A * | 4/1997 | Kivits | .................. | B65G 47/252 198/384 |
| 6,026,831 A * | 2/2000 | Jarvis | .................. | A47L 15/0092 134/127 |
| 8,573,235 B2 * | 11/2013 | Hong | .................... | A47L 15/248 134/104.2 |
| 8,668,071 B2 * | 3/2014 | Florentzson | ............ | B65B 35/26 198/403 |
| 9,125,542 B1 * | 9/2015 | Canaanie | .............. | A47L 15/241 |

* cited by examiner

*Primary Examiner* — Douglas A Hess

(57) ABSTRACT

Disclosed is a tray-and-tableware flipping device being capable of flipping and sorting trays and tableware including dishes and bowls without causing damage to the tableware attributable to collisions. The flipping device also reduces the labor needed for dishwashing by automatically flipping the trays and tableware. Further disclosed is a dishwashing system including a first conveyer transportation unit, the tray-and-tableware flipping device, a flipping device driving unit, a tray transportation conveyer belt, a tableware transportation conveyer belt, and a monitoring or detection sensor.

12 Claims, 2 Drawing Sheets

TRAY-AND-TABLEWARE FLIPPING DEVICE AND DISHWASHING SYSTEM USING SAME

CROSS REFERENCE TO RELATED APPLICATION

The present application claims priority under 35 U.S.C. 119(a) to Korean Patent Application No. 10-2018-0043757, filed Apr. 16, 2018, the entire contents of which is incorporated herein by this reference.

BACKGROUND OF THE DISCLOSURE

1. Field of the Disclosure

The present disclosure relates to a dishwashing system. More particularly, the present disclosure relates to a tray-and-tableware flipping device being capable of automatically sorting and flipping trays and tableware upside down when the tableware placed on the trays are transported to a dishwashing zone. The flipping device prevents the trays and tableware from being damaged due to collisions during transportation of the tableware and the trays to the dishwashing zone by using a shock absorbing unit. The flipping device performs automatic flipping of the trays and tableware, thereby reducing the labor needed for dishwashing. The present disclosure also relates to a dishwashing system including the same flipping device.

2. Background

Typically, a large capacity automatic dishwasher that automatically cleans and dries a large amount of tableware is installed in a cafeteria (also called a canteen) that serves a large group of people in s large facility such as s hotel, hospital, school, or company.

After a meal in such a large food service location, a large number of trays with tableware such as dishes and bowls placed thereon are produced. The trays are transported to a dishwashing zone one after another through a tray return window by a tray return conveyer belt. The trays and the tableware placed on the trays are separated and then moved to respective conveyers so as to be separately washed by a water sprayer and then dried.

There is a known automatic dishwashing system for sorting trays and tableware and separately washing the trays and tableware (refer to Patent Document 1). In the conventional automatic dishwashing system, a conveyer belt for transporting trays on which used tableware including dishes and bowls is placed is tilted to drop the trays and the tableware so as to be separated. In this case, there is a problem that the tableware and the trays are likely to be deformed or broken due to collisions while they fall to respective washing tubs.

There is another problem that much labor is needed for pre-washing to remove soil on the used tableware and the trays and for flipping each piece of the tableware.

BACKGROUND

The present disclosure is intended to provide a tray-and-tableware flipping device being capable of preventing tableware from being deformed or broken due to collisions when the tableware is dropped for washing by using a shock absorbing unit.

In addition, the present disclosure is intended to provide a tray-and-tableware flipping device being capable of separating tableware including dishes and bowls from trays and preventing the tableware from being deformed or broken due to collisions during the separation process.

In addition, the present disclosure is intended to perform automatic flipping of tableware during dishwashing, thereby reducing the labor needed for dishwashing.

In order to accomplish the objectives of the present disclosure, there is provided a tray-and-tableware flipping device including: a rotating unit including a rotary shaft rotated in one direction by an external rotational force and a plurality of rotary blades radially arranged around the rotary shaft in a circumferential direction at an equal interval, in which tray accommodation spaces are provided between each of the rotary blades and each tray accommodation space has a tapered form. The rotating unit receives the trays or the tableware one after another from an external feed unit disposed at one side of the rotating unit, accommodates the trays or the tableware in the tray accommodation spaces, and rotates in conjunction with rotation of the rotary shaft so that the tableware or the trays are turned upside down during rotation of the rotating unit, and sequentially discharging the tableware or the trays in a flipped state every them each of the rotary blades reaches a discharge side opposite to the feed side.

In order to accomplish the objectives of the present disclosure, there is provided a tray-and-tableware flipping device including: a rotating unit including a rotary shaft rotated in one direction by an external rotational force and a plurality of rotary blades radially arranged around the rotary shaft in a circumferential direction at an equal interval, in which tray accommodation spaces are provided between each of the rotary blades and each tray accommodation space has a tapered form. The rotating unit receives the trays with tableware placed thereon one tray after another tray from an external feed unit disposed at one side of the rotating unit, accommodates the trays in the tray accommodation spaces, and rotates in conjunction with rotation of the rotary shaft so that the tableware or the trays are turned upside down during rotation of the rotating unit, and sequentially discharging the tableware and the trays in a flipped state every them each of the rotary blades reaches a discharge side opposite to the feed side.

In order to accomplish the objectives of the present disclosure, there is provided a dishwashing system including: a first conveyer transportation unit including a first conveyer belt receiving and transporting trays with used tableware placed thereon from a tray return window and a first guide receiving the trays from the first conveyer belt and transporting the trays in a powerless manner; a tray-and-tableware flipping device for receiving the trays from the first guide, supporting the trays on multiple rotary blades arranged around a rotary shaft, and rotating in a direction with the trays placed on the rotary blades such that the trays are turned upside down during rotation of the flipping device, and discharging the flipped trays one after another; a stepping motor for rotating the rotary shaft of the tray-and-tableware flipping device; a motor control unit for controlling the stepping motor; a tray guide or a tray transportation conveyer belt disposed at a discharge side of the flipping device, receiving the flipped trays from the flipping device, and transporting the flipped trays to a dishwashing zone; and a third guide or a tableware transportation conveyer belt disposed at the discharge side of the flipping device, receiving the flipped tableware from the flipping device, and transporting the flipped tableware to the dishwashing zone.

The dishwashing system may further include rectangular pusher-receiving recesses, each recess being formed in a surface of a corresponding rotary blade of the plurality of rotary blades and each recess being positioned at an inner portion of the rotary blade; and pushers, each pusher reciprocating in a sliding manner in a longitudinal direction while being disposed in a corresponding pusher-receiving recess of the pusher-receiving recesses due to a gravity or a centrifugal force generated by rotation of the flipping device, thereby pushing out the tableware or the tray from the rotary blade.

The dishwashing system may further include a monitoring or detection sensor at a position at which the flipped tableware or the flipped trays are discharged from the flipping device, and the monitoring or detection sensor may monitor or detect whether all items disposed in a monitoring target tray accommodation space of the flipping device are discharged from the flipping device.

The present disclosure has an advantage of automatically separating tableware from trays.

In addition, the present disclosure has an advantage of preventing tableware from being deformed or broken over the course of transportation and sorting of the tableware and trays.

In addition, the present disclosure has an advantage of performing automatic flipping of trays and tableware.

In addition, the present disclosure has an advantage of reducing the labor needed for dishwashing by merging a pre-washing process and a post-washing process.

In addition, the present disclosure has an advantage of reducing two conveyer tracks as compared with a conventional dishwashing system in which two conveyer tracks are used to flip tableware and one conveyer track is used for transport trays, thereby providing a dishwashing system having a simplified structure and reducing installation cost.

BRIEF DESCRIPTION OF THE DRAWINGS

The above and other objects, features and other advantages of the present disclosure will be more clearly understood from the following detailed description when taken in conjunction with the accompanying drawings, in which.

DETAILED DESCRIPTION

Figure 1:
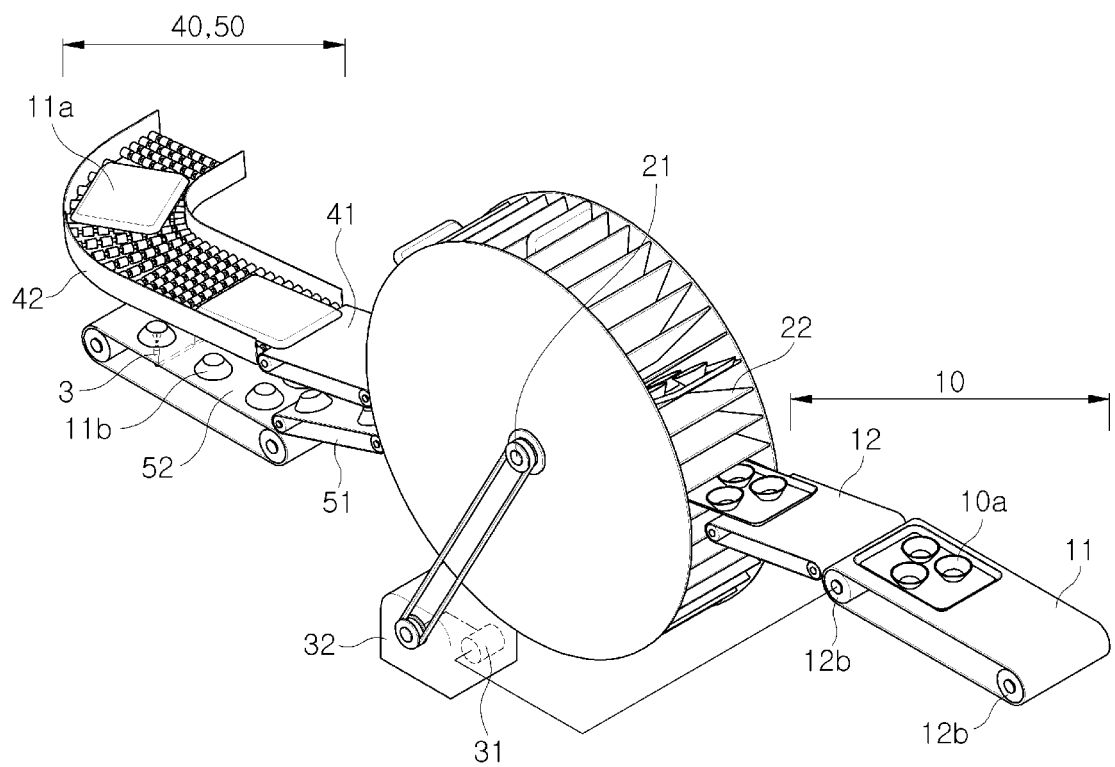
FIG. 1 is a perspective view of a dishwashing system according to one embodiment of the present disclosure.

Hereinafter, exemplary embodiments of the present disclosure will be described in detail with reference to the accompanying drawings. The exemplary embodiments described below may be modified into various forms, so that the scope of the present disclosure should not be construed as being limited to the exemplary embodiments detailed below. The exemplary embodiments are provided to enable those skilled in the art to more easily understand the present disclosure.

Therefore, throughout the drawings, the shapes and the like of elements may be exaggerated for the purpose of clarity and like elements are denoted by like reference numerals.

Further, the detailed description of known functions and configurations that may obscure the gist of the present disclosure will be omitted.

Figure 2:
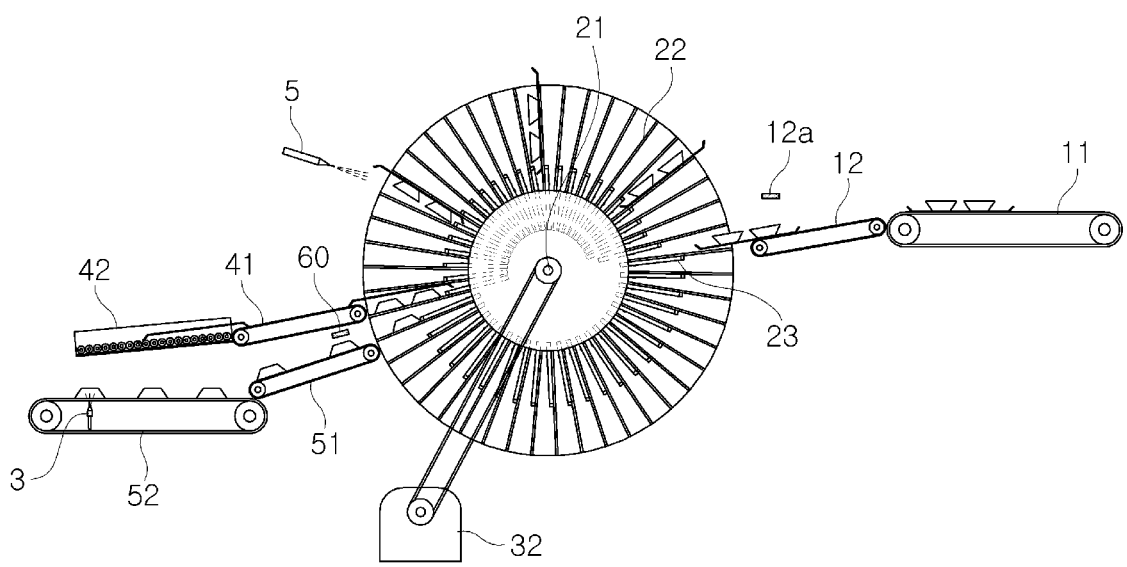
FIG. 2 is a cross-sectional view of the dishwashing system according to the embodiment of the present disclosure.
Figure 3:
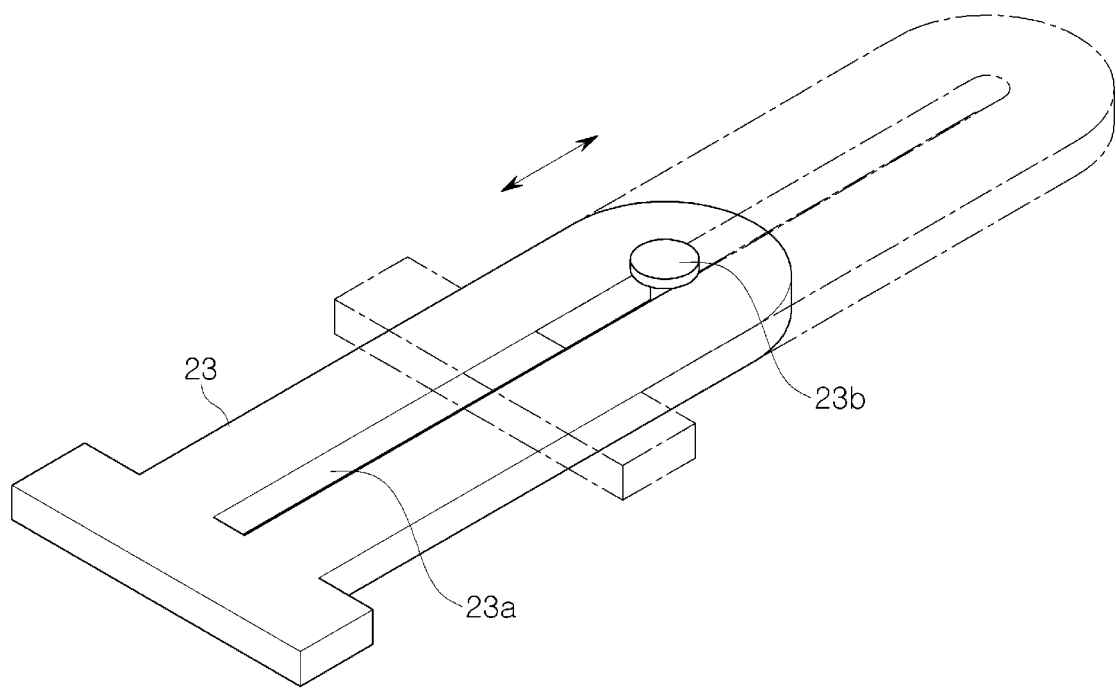
FIG. 3 is a schematic diagram illustrating a pusher of the dishwashing system according to the embodiment of the present disclosure.
Figure 4:
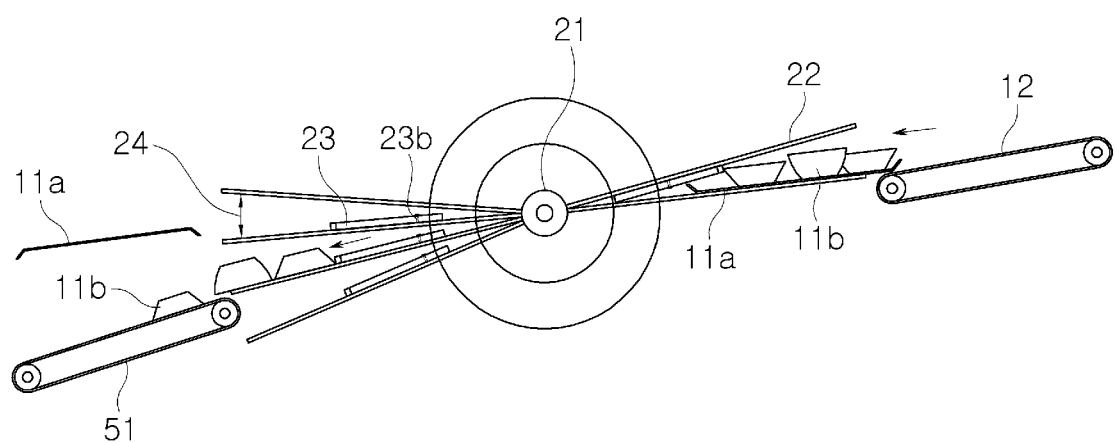
FIG. 4 is a schematic cross-sectional view illustrating one operation state of the dishwashing system according to the embodiment of the present disclosure.

FIG. 1 is a perspective view of a dishwashing system according to one embodiment of the present disclosure; FIG. 2 is a cross-sectional view of the dishwashing system according to the embodiment of the present disclosure; FIG. 3 is a schematic diagram illustrating a pusher of the dishwashing system according to the embodiment of the present disclosure; and FIG. 4 is a schematic cross-sectional view illustrating an operation state of the dishwashing system according to one embodiment of the present disclosure.

Exemplary embodiments of the present disclosure relate to a tray-and-tableware flipping device and a dishwashing system using the flipping device. In the course that trays on which multiple pieces of tableware such as bowls and dishes are placed are transported by a conveyer transportation unit, the tableware and the trays are automatically sorted and then separately washed and dried. The dishwashing system according the exemplary embodiment uses a shock absorbing unit to prevent the tableware from being deformed or broken due to collisions during the tray-and-tableware separation process. Furthermore, the dishwashing system automatically flips the tableware, thereby reducing the labor needed for dishwashing.

A tray-and-tableware flipping device and a dishwashing system according to exemplary embodiments of the present disclosure will be described in detail with reference to FIGS. 1 to 4.

According to one exemplary embodiment of the present disclosure, a tray-and-tableware flipping device 20 includes a rotating unit which rotates like a Ferris wheel. The rotating unit includes a rotary shaft 21 rotated in one direction by an external rotational force, and multiple rotary blades 22 radially arranged around the rotary shaft 21 at an equal interval along a circumferential direction of the rotary shaft 21. Spaces between each of the rotary blades 22 serve as tray accommodation spaces 24.

The rotating unit of the tray-and-tableware flipping device 20 receives trays or tableware pieces sequentially transported by an external feed unit. At this time, the trays are inserted into the respective tray accommodation spaces 24 provided in each of the rotary blades 22. Each tray with tableware placed thereon may be inserted into one of the tray accommodation spaces 24 when the tray accommodation space 24 is disposed at a feed side position. Since the rotating unit rotates in one direction like a Ferris wheel, the trays disposed inside the tray accommodation spaces are sequentially turned upside down at the time of passing a certain point during rotation of the rotating unit and is then discharged to the outside of the rotating unit in a flipped state when reaching a discharge side position which is opposite to the feed side position.

One surface of each of the multiple rotary blades 22 of the tray-and-tableware flipping device 20 is provided with a pusher-receiving recess having a rectangular shape. The pusher-receiving recess is formed at a relatively inner portion near the rotary shaft of the rotary blade 22. A pusher 23 is disposed in the pusher-receiving recess. The pusher 23 reciprocates in a sliding manner in the longitudinal direction of the pusher-receiving recess due to the gravity attributable to the weight of the pusher 23 and the centrifugal force of the rotating unit, thereby pushing the trays or the tableware pieces toward the outside of the rotating unit. Thus, the trays or the tableware pieces can be easily discharged out of the tray accommodation spaces provided in each of the rotary blades 22.

The pusher 23 of the tray-and-tableware flipping device 20 includes an elongated body, a center slot 23a extending in the longitudinal direction of the elongated body and positioned in the center of the width of the elongated body, and a stopper 23b inserted to pass through a portion of the center slot 23a and fixed by a sidewall of the pusher-receiving recess. The stopper 23b restricts linear movement of the pusher 23, thereby defining a reciprocating range of the pusher 23.

According to one exemplary embodiment of the present disclosure, a dishwashing system includes a first conveyer transportation unit 10, the tray-and-tableware flipping device 20 described above, a flipping device driving unit 30, a tray transportation conveyer belt 40, a tableware transportation conveyer belt 50, and a monitoring or detection sensor.

The first conveyor transportation unit 10 is an external feed unit disposed on the feed side of the rotating unit and functions to feed the trays to the respective tray accommodation spaces 24 one after another. In the dishwashing system, a first guide (also referred to as a first ramp) 12 is provided between the first conveyer transportation unit 10 and the rotating unit to guide the trays to be sequentially fed into the tray accommodation spaces 24 of the rotating unit from a first conveyor belt 11 of the first conveyer transportation unit 10.

In addition, a second guide is provided above a portion of the first conveyer belt 11 of the first conveyer transportation unit 10. The second guide is disposed at a predetermined height to restrict the total height of the tableware pieces vertically stacked on the tray. When the tray on which the stacked tableware pieces passes the location of the second guide, the tableware pieces stacked beyond the height of the second guide collapse by colliding with the second guide. Therefore, the total height of the tableware pieces on the tray is adjusted to be lower than the height of the second guide.

The length of each rotary blade 22 of the tray-and-tableware flipping device 20 is shorter than the length or the width of the tray. Therefore, when each of the trays is accommodated into one of the tray accommodation spaces 24, the outer end of the tray protrudes from the outer end of the rotary blade 22. A tray guide (also referred to as a tray ramp) 41 or a tray transportation conveyer belt 40 is disposed on the discharge side of the rotating unit in a manner that an end (hereinafter, referred to as a first end) thereof is close to the outer end of the rotary blade 22 of the tray-and-tableware flipping device 20. Therefore, when the trays are inserted into the respective tray accommodation spaces 24 of the rotating unit at a position on the feed side and then rotated to reach a position on the discharge side (opposite to the feed side), the outer end of each tray meets the end (first end) of the tray guide 41 or the tray transportation conveyer belt 40. Therefore, the trays can be easily transferred from the tray accommodation spaces 24 of the rotating unit to the tray transportation conveyer belt 40 one after another and then transported along the tray transportation conveyer belt 40.

Since the trays and the tableware pieces are turned upside down while the rotating unit rotates with the trays and the tableware piece being disposed inside the tray accommodation spaces, the trays and the tableware pieces are separated from each other and transported in a flipped posture to the tray transportation conveyer belt 40 and the tableware transportation conveyer belt 50, respectively.

The tableware transportation conveyer belt 50 is disposed on the discharge side of the rotating unit and is positioned such that an end (first end) thereof is close to the outer end of the rotary blade 22 of the tray-and-tableware flipping device 20. In addition, a third guide (also referred to as a third ramp) 51 is provided between the outer end of the rotary blade 22 of the rotating unit and the tableware transportation conveyer belt 50. Therefore, the tableware pieces can be readily and sequentially discharged to the tableware transportation conveyer belt 50 via the third guide 51 from the rotating unit.

In addition, a fourth guide is provided above a portion of the tableware transportation conveyer belt 50. The fourth guide is disposed at a predetermined height to restrict the total height of the tableware pieces vertically stacked while the tableware pieces are transported along the tableware transportation conveyer belt 50. That is, when the stacked tableware pieces pass the location of the fourth guide, the stacked tableware pieces collapse by colliding with the fourth guide. Therefore, the tableware pieces on the tableware transportation conveyer belt 50 are rearranged such that the total height of the tableware pieces stacked is adjusted to be lower than the height of the fourth guide.

The flipping device driving unit 30 includes a stepping motor 31 for rotating the rotary shaft 21, and a motor control unit 32 for controlling operation of the stepping motor 31. The motor control unit 32 controls the stepping motor 31 such that the rotating unit rotates by a predetermined angle and then stops for a predetermined duration. In addition, a conveyer belt operation control unit is included. The conveyer belt operation control unit controls the linear movement of the conveyer belt in association with the operation of the stepping motor 31 such that the conveyer belt of the first conveyer transportation unit 10 starts moving linearly when the stepping motor 31 starts rotating and the conveyer belt of the first conveyer transportation unit 10 stops moving when the stepping motor 31 stops rotating.

The monitoring or detection sensor 60 is disposed at a position on the discharge side of the rotating unit. The monitoring or detection sensor 60 functions to monitor or detects whether all of the items in a monitoring target tray accommodation space 24 of the multiple tray accommodation spaces 24 of the rotating unit are discharged.

When it is determined that all of the items are discharged from the monitoring target tray accommodation space 24, the monitoring or detection sensor 60 transmits a signal indicating that no item remains in the monitoring target tray accommodation space 24 to the stepping motor 31 and the driving motor of the first conveyer belt 11. At this time, the stepping motor 31 and the driving motor of the first conveyer belt 11 are switched on to start rotating. On the other hand, when it is determined that not all of the items are discharged from the monitoring target tray accommodation space 24, the monitoring or detection sensor 60 transmits a signal indicating that some items remain in the tray accommodation space 24. In this case, the stepping motor 31 and the driving motor of the first conveyer belt 11 are switched off so that the stepping motor 31 and the driving motor of the first conveyer belt 11 do not operate for a predetermined duration. Therefore, the tableware and the tray in the monitoring target tray accommodation space can be reliably discharged.

Referring to FIG. 1, the tray-and-tableware flipping device 20 and the dishwashing system using the tray-and-tableware flipping device 20 operate in such a manner that trays with tableware (for example, dishes and bowls) placed thereon are mounted onto the first conveyer belt 11 one after another from the tray return window, are then moved along the first conveyer belt 11, are transferred to the first guide (first ramp) 12 installed between the first conveyer belt 11 and the rotating unit of the tray-and-tableware flipping device 20, and sequentially introduced into the tray accommodation spaces 24 of the rotating unit of the tray-and-tableware flipping device 20 by the gravity and the inertial force.

That is, after a metal, diners or workers employed for dishwashing put the trays with the tableware (for example, dishes and bowls) on the first conveyer belt 11. The trays mounted on the first conveyer belt 11 linearly move toward the tray-and-tableware flipping device 20. Next, the trays are transferred to the first guide 12 due to the inertial force and then slide along the surface of the first guide 12 into the tray accommodation spaces of the rotating body of the tray-and-tableware flipping device 20 due to the gravity because the first guide 12 is sloped down toward the tray-and-tableware flipping device 20 from the first conveyer belt 11.

Referring to FIGS. 1 to 4, the tray-and-tableware flipping device 20 includes the rotary blades 22 engaged with the rotary shaft 21 controlled by the motor control unit 32, the tray accommodation spaces 24 defined between each of the rotary blades 22, and the pushers 23 provided on the respective rotary blades 22. Each of the pushers 23 absorbs a shock when one of the trays is transferred onto the corresponding rotary blade 22 (i.e., introduced into the corresponding tray accommodation space 24). While the tray-and-tableware flipping device 20 is rotated, each rotary blade 22 reaches a predetermined position on the discharge side, the tray with the tableware placed thereon is turned upside down. In this state, the pusher 23 pushes the tray and the tableware that are turned upside down. Therefore, the flipped tray and tableware can be discharged from the tray accommodation space 24 due to the gravity and the centrifugal force of the rotating unit. Then, the tray and tableware are transferred to the tray and tableware transportation conveyer belts 40 and 50.

That is, after the trays and tableware are discharged from the tray-and-tableware flipping device 20, the trays and the tableware are respectively transferred to the tray transportation conveyer belt 40 and the tableware transportation conveyer belt 50 in a flipped posture.

Each of the pushers 23 is installed in the rectangular pusher-receiving recess formed in the surface of a corresponding one of the rotary blades 22. Each of the pusher 23 includes the elongated body, the center slot 23a extending in the longitudinal direction, and the stopper 23b provided in the center slot 23a and fixed by the side wall of the pusher-receiving recess. The stopper 23b functions to restrict the movement of the pusher 23, thereby defining a reciprocating range of the pusher 23. The pusher 23 is provided inside the tray accommodation space 24. The pusher 23 reciprocates in an inward-outward direction of the tray accommodation space 24 in a sliding manner in association with the rotation of the rotary shaft 21 and with the rotation and tilting of the rotary blade 22.

As illustrated in FIG. 4, each of the tray accommodation spaces 24 is provided with only one pusher 23 to push only the tableware. Alternatively, each of the tray accommodation spaces 24 is provided with two pushers 23 to push the tableware and the tray, respectively.

The flipping device driving unit 30 includes: the stepping motor 31 for controlling the rotation speed (i.e., revolutions per minute (RPM)) of the rotary shaft 21 of the tray-and-tableware flipping device 20 and the rotation speed of the driving motor of the first conveyer transportation unit 10; and the motor control unit 32 for transferring the driving power to the rotary shaft 21 and the driving motor.

The stepping motor 31 is designed to control the rotation speed of the rotary shaft 21 such that each of the rotary blades 22 repeats a cycle of a rotation duration in which the rotary blade 22 rotates by a predetermined angle in one direction and a stationary duration in which the rotary blade 22 remains stationary. Alternatively, the rotation of the rotary shaft 21 is stopped for a predetermined duration according to the signal transmitted from the monitoring or detection sensor 60.

The monitoring or detection sensor 60 is provided at one side of the tray transportation conveyer belt 40 or the tableware transportation conveyer belt 50 to determine whether the tray and the tableware are completely transferred to the tray transportation conveyer belt 40 and the tableware transportation conveyer belt 50 in a flipped posture from the tray-and-tableware flipping device 20. On the basis of the determination, the monitoring or detection sensor transmits the signal indicating the presence or absence of the tray or the tableware to the flipping device driving unit 30. The stepping motor 31 or the driving motor is controlled according to the signal.

In addition, the monitoring or detection sensor 60 includes a motion sensor installed on one side of the first guide 12 of the first conveyer transportation unit 10 to detect the amount (angle) of rotation of the rotary shaft 21 of the tray-and-tableware flipping device 20.

The motor control unit 32 includes a gear unit or a belt unit connected between the motor control unit 32 and the rotary shaft 21 to transfer the driving force to the rotary shaft 21.

In addition, the motor control unit 32 controls he rotary shaft 21 of the tray-and-tableware flipping device 20 and the driving motor of the first conveyer transportation unit 10 such that the rotary shaft 21 and the driving motor start or stop operating according to the signal indicating the presence or absence of the tray and the tableware, which is transmitted from the monitoring or detection sensor 60.

According to the control of the flipping device driving unit 30, each tray is transferred to the corresponding rotary blade 22 that temporarily remains stationary while sliding along the inclined first guide 12 of the first conveyer transportation unit 10 due to the gravity and the inertial force, and afterwards the rotary blade 22 is rotated. In this way, a cycle of the rotation duration and the stationary duration of each rotary blade 22 is repeated. Thus, the trays with the tableware placed thereon are sequentially transported and flipped one after another.

In addition, when one of the rotary blades 22 of the tray-and-tableware flipping device 20 reaches the discharge side position after being rotated in a state of supporting the tray with the tableware placed thereof and temporarily remains stationary at that position, the pusher slides down to push only the tray due to the gravity and the centrifugal force of the rotating unit. Therefore, the tray is transferred to the inclined tray transportation conveyer belt 40 in a flipped (upside down) state. Then, the rotary blade is further rotated and then stopped at the position at which the tableware transportation conveyer belt 50 is disposed. At this time, the tableware remaining on the rotary blade 22 is transferred to the inclined third guide 51 of the tableware transportation conveyer belt 50 in a flipped state and then transported by the tableware transportation conveyer belt 50.

Each of the rotary blades 22 of the tray-and-tableware flipping device 20 may be further provided with a locking unit such that each of the rotary blades 22 is rotated by a predetermined angle and then maintains a stopped state for a predetermined duration. That is, the rotary blades 22 of the tray-and-tableware flipping device 20 are intermittently rotated by a predetermined angle each time.

As illustrated in FIGS. 1 and 2, the tray conveyor belt includes the tray guide 41 that is inclined at a predetermined angle to receive and transport the flipped trays from the rotary blades 22 one after another in a powerless manner. The tray transportation conveyer belt 40 further includes a tray transportation unit 42 that transports the trays to a tray washing zone.

The tray guide 41 is inclined downward from the tray-and-tableware flipping device toward the tray transportation unit. Therefore, the trays slide down toward the tray transportation unit 42 due to the gravity and the inertial force. Therefore, the trays can be transported without electric power consumption (i.e., in a powerless manner). An upper end of the tray guide 41 is provided with a tray cutting brush to hold and pull an end of the flipped tray so that the tray can be easily moved.

The tray transportation unit 42 may be configured to be driven by electric power. Alternatively, the tray transportation unit 42 may be configured to have an inclination so that the trays can be moved by the inertial force (in a powerless manner).

As illustrated in FIGS. 1 and 2, the tableware conveyor belt 50 includes the third guide 51 that is inclined at a predetermined angle to receive and transport the flipped trays from the rotary blades 22 one after another in a powerless manner. The tableware transportation conveyer belt 50 further includes a tableware transportation unit 52 that transports the tableware to a tableware washing zone.

The third guide 51 is inclined down from the tray-and-tableware flipping device 20 toward the tableware transportation unit 52 so that the tableware slides down due to the gravity and the inertial force. That is, due to the inclined third guide 51, the tableware can be moved in a powerless manner. The tableware transportation unit 52 may be driven by electric power. Alternatively, the tableware may be transported in a powerless manner by the tableware transportation unit 52 having a ramp structure.

Although not illustrated in FIGS. 1 and 2, the dishwashing system according to the present disclosure may further include a washing water collection unit that collects washing water generated from a tray-and-tableware drying unit, a pre-washing unit, and a post-washing process and discharges the collected washing water to the outside of the dishwashing system.

The pre-washing unit is installed outside the tray-and-tableware flipping device 20 so as to easily, rapidly, and simultaneously wash the trays and the tableware by spraying washing water to the trays and the tableware.

The washing water collection unit is installed under the tray-and-tableware flipping device 20. Clean washing water is sprayed onto the trays and the tableware received in the tray accommodation spaces of the tray-and-tableware flipping device 20 from the pre-washing unit, and the used washing water and soil remaining on the trays and the tableware fall to the washing water collection unit disposed under the tray-and-tableware flipping device 20. The used washing water and the washed soil are then drained from the washing water collection unit.

The present disclosure described above provides advantages: automatic storing of tableware and tray; prevention of deformation or breakage of tableware and trays during movement or sorting of the tableware and trays; automatic flipping of tableware; and reduction in labor needed for dishwashing by a merged pre-washing and post-washing unit.

In addition, the tray and the tableware can be turned upside down at the same time by the tray-and-tableware flipping device. In addition, the dishwashing system according to the present disclosure lacks two conveyer units as compared with conventional dishwashing systems.

Therefore, the structure of the dishwashing system according to the present disclosure is simpler, and less installation cost is incurred than conventional dishwashing systems.

Although the present disclosure has been described with reference to the preferred embodiments, it should be understood that the scope of the present disclosure is defined by the accompanying claims rather than the description of the preferred embodiments. It is also apparent to those skilled in the art that various modifications and variations can be made without departing from the spirit and scope of the disclosure.

What is claimed is:

1. A dishwashing system comprising:
a tray-and-tableware flipping device,
wherein the tray-and-tableware flipping device comprises a rotating unit including a rotary shaft rotated in one direction by an external rotational force and a plurality of rotary blades radially arranged at an equal interval along a circumferential direction of the rotary shaft, the rotating unit having tray accommodation spaces between each of the rotary blades, each tray accommodation space having a tapered form,
wherein the rotary blades of the rotating unit sequentially receive trays from an external feed unit disposed on a feed side of the rotating unit so that the trays are inserted into the respective tray accommodation spaces one after another and are rotated by the rotary shaft in a state in which the trays are disposed on the respective rotary blades until reaching a discharge side of the rotating unit, wherein the trays and tableware are turned upside down during rotation of the rotary blades, and the flipped trays and tableware are sequentially discharged out of the rotating unit when reaching the discharge side;
a first conveyer transportation unit for sequentially feeding the trays with the tableware placed thereon to the rotating unit one tray after another, the first conveyer transportation unit corresponding to the external feed unit; and
a first guide provided at a predetermined height above a portion of a conveyer belt of the first conveyer transportation unit, the first guide functioning to adjust a total height of a plurality of pieces of tableware stacked on each other to be lower than the predetermined height of the first guide when the total height exceeds the predetermined height of the first guide.

2. The dishwashing system according to claim 1, further comprising a second guide disposed between the first conveyer transportation unit and the rotating unit, the second guide functioning to guide the trays from the first conveyer transportation unit to the tray accommodation spaces of the rotating unit.

3. The dishwashing system according to claim 1, wherein the external rotational force used to rotate the rotary shaft is a rotational force generated by a stepping motor.

4. The dishwashing system according to claim 3, further comprising a monitoring or detection sensor disposed at a position from which the flipped tableware or the trays are sequentially discharged, the monitoring or detection sensor functioning to monitor or detect whether items disposed inside a monitoring target tray accommodation space of the tray accommodation spaces are all discharged.

5. The dishwashing system according to claim 4, wherein: when it is determined that all of the items are discharged from the monitoring target tray accommodation space, the monitoring or detection sensor transmits a signal indicating that no item remains in the monitoring target tray accommodation space to the stepping motor and a driving motor of a first conveyer belt so that the stepping motor and the driving motor of the first conveyer belt are switched on to start rotating; and when it is determined that not all of the items are discharged from the monitoring target tray accommodation space, the monitoring or detection sensor transmits a signal indicating that several items remain in the monitoring target tray accommodation space to the stepping motor and the driving motor of the first conveyer belt, so that the stepping motor and the driving motor of the first conveyer belt are switched off to stop rotating for a predetermined duration, thereby enabling the tableware and the tray can be readily discharged from the tray-and-tableware flipping device.

6. The dishwashing system according to claim 5, further comprising a conveyer belt movement control unit that controls the stepping motor and a conveyer belt in association with each other such that movement of the conveyer belt of a first conveyer transportation unit is performed when rotation of the stepping motor is started and the movement of the conveyer belt of the first conveyer transportation unit is not performed when rotation of the stepping motor is stopped.

7. The dishwashing system according to claim 3, further comprising a motor control unit controlling the rotary blades to repeat a cycle composed of a rotation duration in which the rotary blade is rotated by a predetermined angle and a stationary duration in which the rotary blade remains stationary.

8. The dishwashing system according to claim 7, further comprising a conveyer belt movement control unit that controls the stepping motor and a conveyer belt in association with each other such that movement of the conveyer belt of a first conveyer transportation unit is performed when rotation of the stepping motor is started and the movement of the conveyer belt of the first conveyer transportation unit is not performed when rotation of the stepping motor is stopped.

9. A dishwashing system comprising:
a tray-and-tableware flipping device,
wherein the tray-and-tableware flipping device comprises a rotating unit including a rotary shaft rotated in one direction by an external rotational force and a plurality of rotary blades radially arranged at an equal interval along a circumferential direction of the rotary shaft, the rotating unit having tray accommodation spaces between each of the rotary blades, each tray accommodation space having a tapered form,
wherein the rotary blades of the rotating unit sequentially receive trays from an external feed unit disposed on a feed side of the rotating unit so that the trays are inserted into the respective tray accommodation spaces one after another and are rotated by the rotary shaft in a state in which the trays are disposed on the respective rotary blades until reaching a discharge side of the rotating unit, wherein the trays and tableware are turned upside down during rotation of the rotary blades, and the flipped trays and tableware are sequentially discharged out of the rotating unit when reaching the discharge side;
a tableware transportation conveyer belt disposed on the discharge side and having a first end positioned near an outer end of the rotary blade;
rectangular pusher-receiving recesses, each recess being formed in a surface of a corresponding rotary blade of the plurality of rotary blades and each recess being positioned at an inner portion of the corresponding tray accommodation space; and
pushers, each pusher reciprocating in a sliding manner in a longitudinal direction while being disposed in a corresponding one of the pusher-receiving recesses due to a gravity or a centrifugal force generated by rotation of the rotating unit, thereby pushing out the tableware or the tray from the tray accommodation space.

10. The dishwashing system according to claim 9, wherein the pusher has an elongated body, a center slot having a predetermined length and disposed in a center portion of a width of the elongated body, and a stopper disposed in the center slot, fixed by a sidewall of the pusher-receiving recess, and functioning to restrict a reciprocating range of the pusher.

11. A tray-and-tableware flipping method comprising:
sequentially feeding trays with tableware placed thereon to a conveyer belt of a first conveyer transportation unit one after another;
sequentially inserting the trays one after another into tray accommodation spaces defined between rotary blades of a rotating unit;
turning the trays and tableware upside down by rotating the rotating unit;
discharging the trays and tableware flipped upside down out of the rotating unit by using a gravity or a centrifugal force of the rotating unit; and
separately discharging the trays and tableware by causing the discharged trays to move along a tray guide or a tray transportation conveyer belt.

12. The method according to claim 11, further comprising:
spraying washing water using a washing water spray nozzle to the tableware while the discharged tableware moves along the tray transportation conveyer belt.

* * * * *